United States Patent [19]
Buchholz et al.

[11] Patent Number: 5,275,790
[45] Date of Patent: Jan. 4, 1994

[54] STRUCTURE AND METHOD FOR CATALYTICALLY REACTING FLUID STREAMS IN MASS TRANSFER APPARATUS

[75] Inventors: Matt Buchholz; Ronald Pinaire; Michael A. Ulowetz, all of Wichita, Kans.

[73] Assignee: Koch Engineering Company, Inc., Wichita, Kans.

[21] Appl. No.: 954,703

[22] Filed: Sep. 30, 1992

Related U.S. Application Data

[63] Continuation of Ser. No. 501,493, Mar. 30, 1990, abandoned.

[51] Int. Cl.$^5$ ................................................ B01J 8/00
[52] U.S. Cl. .................................... 422/217; 422/190; 422/211; 422/213; 422/216
[58] Field of Search ............ 422/190, 211, 213, 216–; 202/158; 263/94–; 203/29, DIG.

[56] References Cited

U.S. PATENT DOCUMENTS

| | | | |
|---|---|---|---|
| 3,112,256 | 11/1963 | Young et al. | 422/211 |
| 3,595,626 | 7/1971 | Sowards | 422/217 |
| 4,108,218 | 8/1978 | Estes et al. | 141/1 |
| 4,208,284 | 6/1980 | Pretorius et al. | 261/94 |
| 4,302,356 | 11/1981 | Smith | 502/159 |
| 4,307,254 | 12/1981 | Smith | 568/697 |
| 4,439,350 | 3/1984 | Jones | 502/240 |
| 4,443,559 | 4/1984 | Smith | 502/300 |
| 4,744,928 | 5/1988 | Meier | 261/95 |

*Primary Examiner*—Lyle A. Alexander
*Attorney, Agent, or Firm*—Shook, Hardy & Bacon

[57] ABSTRACT

A method and apparatus for concurrently catalytically reacting fluid streams and distilling the reaction product. A catalytic structure is provided within a distillation column reactor and includes mass transfer devices presenting hollow spaces and a fixed catalyst bed formed from solid catalyst particles. The mass transfer devices are interconnected gas and liquid permeable elements. The liquid phase preferentially flows along channels formed in the catalyst bed before contacting the devices for mass transfer with the vapor phase which primarily flows through the devices.

12 Claims, 2 Drawing Sheets

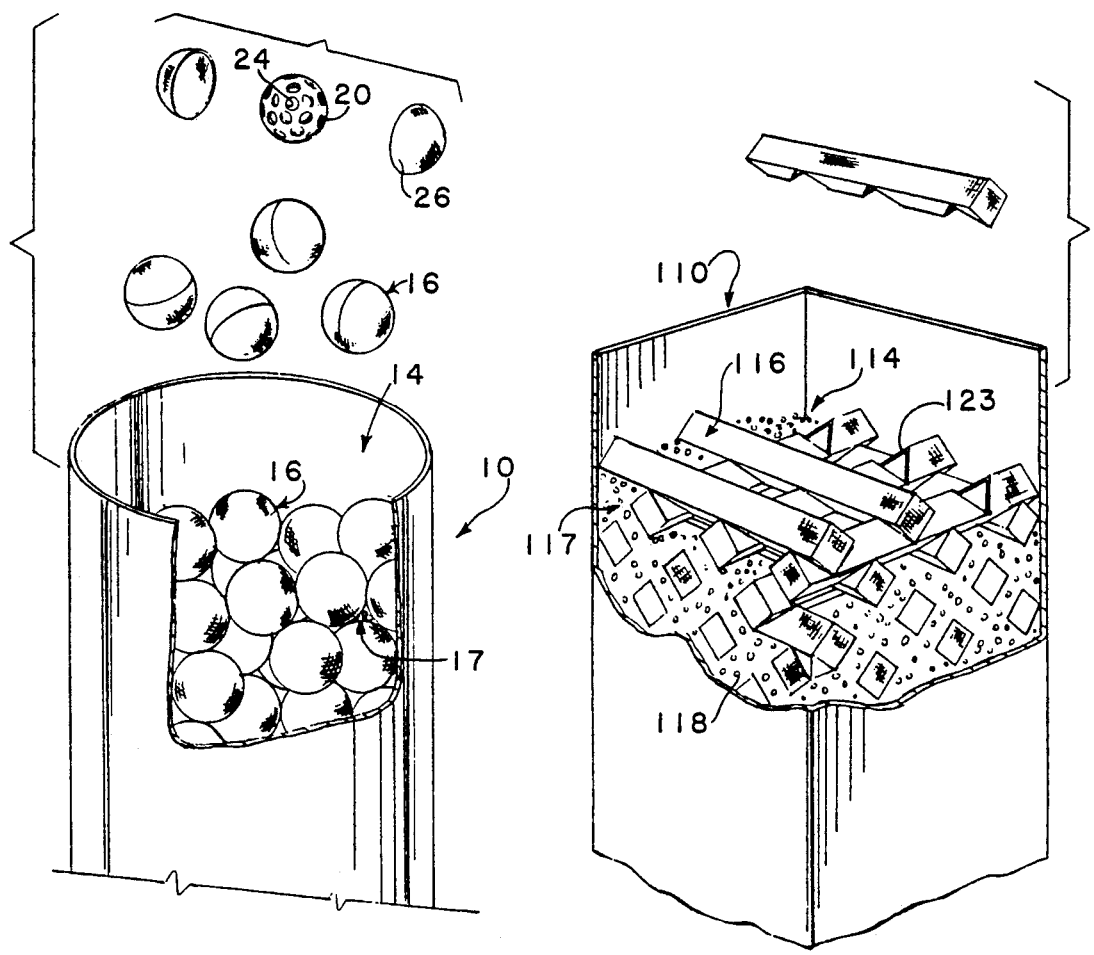
FIG. 1
FIG. 3
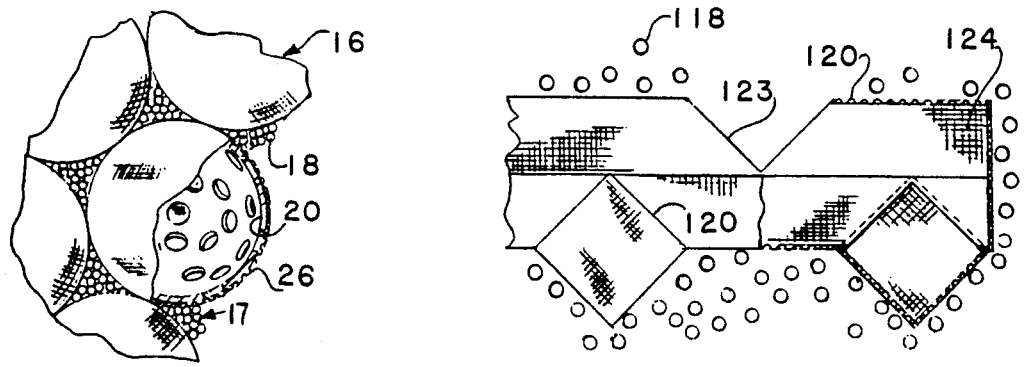
FIG. 2
FIG. 4

STRUCTURE AND METHOD FOR CATALYTICALLY REACTING FLUID STREAMS IN MASS TRANSFER APPARATUS

This is a continuation of copending application Ser. No. 07/501,493 filed on Mar. 30, 1990 now abandoned.

BACKGROUND OF THE INVENTION

This invention relates in general to a mass transfer or distillation apparatus and, more particularly, to a structure for concurrently contacting a fluid stream with a particulate solid catalyst while distilling the reaction product.

Previous structures for carrying out catalytic reactions within distillation columns generally comprise containers which are filled with catalyst and are arranged within the column to concurrently serve as a catalytic and distillation structure. Examples of such structures may be found in U.S. Pat. Nos. 4,439,350 and 4,302,356.

A disadvantage of known structures for a reaction with distillation system is the significant operational down time experienced while initially loading the structures within the distillation column and while replacing the catalyst when it is spent. To load conventional structures personnel must enter the column and physically stack the distillation trays and catalyst containers. When it is desired to replace the catalyst, the entire structure must be removed from the column. Some catalysts may have a cycle life as short as several months and the down time to change the catalyst causes substantial losses in operating time. The prior art reactive distillation structures also represent a safety risk to personnel who must enter the column to pack and unpack the structure, especially when hazardous materials have been charged to the column.

SUMMARY OF THE INVENTION

It is an object of the present invention to provide a method for concurrently catalytically reacting and distilling fluid streams within a column.

It is also an object of this invention to provide a method for concurrently catalytically reacting and distilling fluid streams in a manner which allows increased operational control over the reaction system within the column.

It is a further object of this invention to provide a structure within a distillation or mass transfer column which allows concurrent reaction with distillation of fluid streams and which preferentially channels the reactive liquid phase through the catalytic material so that greater molecular concentrations of reactants are brought into contact with the catalyst.

It is a still further object of this invention to provide a structure within a mass transfer or distillation column which allows concurrent reaction with distillation of fluid streams and which allows easy installation and removal of the reaction catalyst so that down time in replacing the catalyst is minimized.

It is yet another object of this invention to provide a structure within a mass transfer or distillation column which allows concurrent reaction with distillation of fluid streams and which allows easy installation and removal of the mass transfer devices without exposing personnel to the safety risk incurred in entering the distillation column.

To accomplish these and other related objects of the invention, a column is provided with a plurality of mass transfer devices surrounded by a particulate solid catalyst bed. The term "mass transfer column" as used herein is intended to encompass distillation columns as well as columns which have mass transfer or distillation zones as well as other processing zones. The mass transfer devices are generally hollow and have a permeable wall portion which allows passage of vapor and liquid but prevents passage of the catalyst particles. In one embodiment of the invention, the mass transfer devices comprise disconnected elements which may be dumped into the distillation column for a random packing. In another embodiment of the invention, the mass transfer devices comprise interconnected elements which are arranged in superimposed layers within the distillation column.

The catalyst bed forms a reaction zone and contains pathways or channels through which the liquid phase of the fluid stream preferentially flows. The vapor phase streams preferentially (though not exclusively) flows through the channels formed in the interior volumes or spaces of the mass transfer devices. The surfaces of the devices comprise a primary mass transfer zone separate from the reaction zone. Inducing sufficient liquid phase flow saturates flow channels through the catalyst and liquid is forced to the surface of the mass transfer devices where mass transfer occurs through contact with the vapor phase. Some mass transfer may also occur within the devices as liquid and vapor phases make contact.

BRIEF DESCRIPTION OF THE DRAWINGS

In the drawings where like reference numerals are used to refer to like parts in the various views:

FIG. 1 is a fragmentary perspective view of a column constructed according to the present invention shown with portions exploded and with portions broken away to illustrate the internal components;

FIG. 2 is an elevational view of a spherical mass transfer device shown in FIG. 1, portions of the device being broken away to reveal details of construction;

FIG. 3 is a fragmentary perspective view of another embodiment of a column according to the present invention shown with portions exploded and with portions broken away to illustrate details of the internal components;

FIG. 4 is a fragmentary view of the mass transfer devices shown in FIG. 3, the devices shown in elevation and with portions broken away to reveal details of construction;

DESCRIPTION OF THE PREFERRED EMBODIMENT

Figure 5:
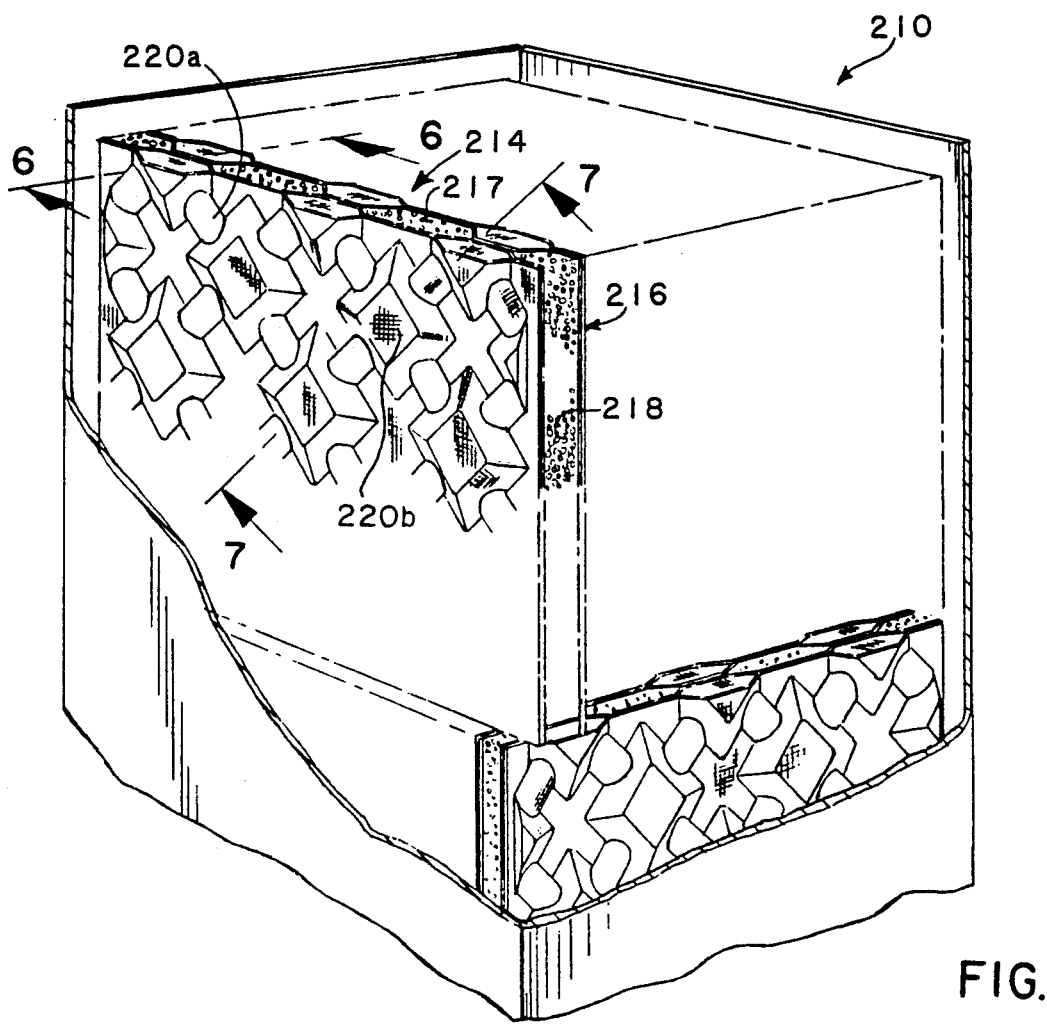
FIG. 5 is a fragmentary perspective view, with portions broken away and shown in cross-section, of another alternative embodiment of the invention.

Referring now to the drawings in more detail and initially to FIG. 1, one embodiment of a distillation column reactor of the present invention for catalytically reacting fluid streams with distillation of the reaction products is represented generally by the numeral 10. Distillation column 10 is generally cylindrical in construction and includes a catalytic structure 14 which is disposed within a zone of the column.

Turning additionally to FIG. 2, the catalytic structure 14 comprises spherical mass transfer devices in the form of perforated spheres or balls 16 surrounded by a fixed catalyst bed 17 comprising solid catalyst particles 18. Only a small number of catalyst particles are shown in the drawings for the sake of clarity. Each mass transfer device 16 comprises a generally hollow support element formed by an enclosed wall portion 20. The wall may be constructed from any one of many materials which are suitably rigid for maintaining the desired shape when packed in the column.

A plurality of apertures 24 are formed in the wall portion of each element to provide communication between the interior volume or space and the exterior surface of the element. The size and number of apertures in the support elements 20 may be varied to suit the requirements for particular applications. In those applications where the diameter of apertures 24 exceeds the diameter of the catalyst particles 18, a screen 26 or other barrier may be coupled with the wall 20 to prevent passage of the catalyst particles through the apertures and into the interior spaces of the mass transfer devices. The screens 26 must be liquid and gas permeable and have a mesh size to prevent passage of the catalyst particles 18 through the apertures while allowing for the desired liquid and gas permeability. Suitable screen materials include aluminum, steel and stainless steel or other types of wire mesh; nylon, Teflon (DuPont trademark) or other types of plastic mesh material; and cloth materials such as cotton, fiberglass, polyester, nylon and the like.

The mass transfer devices 16 may comprise various geometric shapes in addition to the spherical shape illustrated. The devices may also be constructed in different fashions. As one example, the wall portion 20 of the devices 16 may be formed from suitably rigid screen material. The interstitial openings in the weave of the screen material function as apertures for allowing communication with the interior spaces of the mass transfer devices but prevent passage of the catalyst particles. The woven material also presents a relatively large and effective surface area for accumulating liquid for mass transfer.

The catalyst bed 17 may comprise any solid particulate material which is recognized as functioning as a catalyst for the applicable reaction occurring within the reaction zone of the column 10. The catalyst may be an acid or basic catalyst or may comprise catalytic metals and their oxides, halides or other chemically reacted states. Molecular sieves may also be utilized as the catalyst. The catalyst chosen should be heterogeneous with the system reaction and the fluids charged to the column. By way of example, acid cation exchange resins may be used for dimerization, polymerization, etherification, esterification, isomerization, and alkylation reaction. Other catalysts such as molecular sieves, magnesia, chromia and brucite may be used for isomerization reactions.

The catalyst 18 is preferably either a cylindrically shaped extrudate or in the form of small beads or the like or may comprise irregularly shaped granules or fragments. The term particulate material used herein is intended to encompass all of the foregoing. A uniform shape is preferred because it readily flows to fill the pore spaces or void areas between the mass transfer devices after the latter have been charged to the distillation column. The size of the catalyst particles may be varied depending upon the requirements of the particular applications.

Devices 16 are dump loaded into the reaction zone of the distillation column 10 with the balls in touching relationship to create a continuous random packing. One preferred method for charging balls and catalyst to facilitate even cross-sectional loading of the column involves loading the devices 16 to a preselected depth, thus assuring device to device contact in the column and then dense loading the catalyst on the top of the devices. The catalyst particles, being but a small fraction of the size of device 16, will gravitate between and around the balls filling the void areas as indicated in FIG. 2. The catalyst loading is terminated slightly below the top "row" of devices so that additional devices can then be loaded and be assured of touching the next adjacent lower devices. This sequence is then repeated until the desired catalyst bed height is reached.

Although the relative volumes of the catalyst and devices 16 in the catalytic structure 14 may be varied depending upon the particular application as well as economic considerations, a catalyst loading of 5-40% of the overall structure volume is generally suitable for most applications. A preferred range for the catalyst volume is 30-33%. Thus, a volume of anywhere from 60-95% of the available column volume is used for vapor phase travel through the mass transfer devices.

The catalytic structure 14 operates as a concurrent catalytic reaction and distillation system and has particular applicability with liquid phase reactions having products separable by distillation and counter current gas/liquid contacting in liquid phase heterogeneous catalyst systems. When the catalytic structure is loaded into the column, the interior spaces of the devices 16 promote the flow of vapor which contacts liquid on the device surface for effective mass transfer. Some mass transfer will also occur within the hollow interior of devices 16. Simultaneously, the catalytic reaction is taking place primarily in the reaction zone presented by catalyst particles 18.

During operation of the distillation column 10, one or more fluid streams are charged to the column. The liquid phase of the fluid streams preferentially flows through channels formed in the permeable catalyst bed 17 surrounding the mass transfer devices 16. Entry of the liquid phase into the mass transfer zone presented by the surfaces of devices 16 occurs when the flow rate is sufficient to saturate the catalyst channels. With increasing flow rates, the liquid phase is then forced into contact with the surfaces of the devices. The quantity of liquid weeping into the mass transfer zones is a function of the pressure differential between the mass transfer and catalytic reaction zones. The quantity of material entering the mass transfer zone can thus be controlled by regulation of the liquid flow rate or other process parameters which in turn control the liquid flow rate. The amount of material entering the reaction zone may also be regulated by controlling the liquid flow rate.

Distillation of the liquid phase produces a vapor phase which primarily flows through the channels formed by the interior spaces of devices 16. This results in interaction, primarily at the surface of the devices, between the liquid and vapor phases within the mass transfer zone to achieve the desired mass transfer between the phases. The vapor preferentially flows through interconnected mass transfer zones created by devices 16 which are in contacting relationship with each other and which have at least some apertures in approximate alignment, although other less direct pathways are also utilized. The aligned apertures also control the vapor flow into the catalyst region where the wall portions of the devices are in contact. The reaction and distillation products may be removed from the column in a manner well known to those skilled in the art.

The design of catalytic structure 14 is particularly advantageous in that it allows the mass transfer devices or balls 16 and catalyst 18 to be dump loaded into the distillation column 10. This significantly reduces the loss in operation time which would otherwise result with personnel entering the distillation column and physically stacking the packing. Loading of the structure 14 in columns with complex geometries is facilitated by this type of loading. The safety risk to personnel is also reduced by allowing the catalytic structure to be charged to the reaction zone without requiring entry of personnel into the column.

Removal of devices 16 and catalyst 18 may be easily accomplished by simply opening the dump nozzles which are positioned at the bottom of the reaction zone of the column. If necessary, a manway may also be installed beneath the reaction zone of the column to provide access to the catalyst and devices 16. Once withdrawn from the column, the balls may be separated from the catalyst by screening or other methods and repacked in the distillation column with new catalyst as previously described. The limited cycle life of many catalysts may require frequent replacement of the catalyst and the system of the present invention significantly reduces the operational down time which occurs with conventional structures which require removal and replacement, within the columns, of the entire distillation and catalytic structures.

Referring now to FIGS. 3-4, an alternate embodiment of a distillation column of the present invention is represented by the numeral 110. Column 110 is provided with a catalytic structure 114 which is disposed within a portion of the column and which concurrently serves as a catalytic reaction and a distillation structure. Although column 110 is shown in square cross-section, other shapes such as a cylindrical column may be used.

Catalytic structure 114 comprises mass transfer devices 116 around which is a fixed catalyst bed 117 comprising solid catalyst particles 118. The devices 116 are elongated along an axial length and are disposed in a generally horizontal orientation although other orientations may be used. The devices have a generally diamond-shaped transverse cross-section but other geometric configurations such as cylindrical and elliptical may also be employed. Devices 116 are arranged in horizontal layers within the catalyst bed with the devices in each layer being in parallel and side-by-side orientation. Each layer of devices is rotated at a selected axial displacement from an adjacent layer of devices for increased utilization of the catalyst bed cross-section and improved liquid and vapor flow distribution. A displacement of 90° is preferred so that a uniform vertical grid is formed, but it may also be desired to utilize other axial displacements between 5° and 90°.

Each mass transfer device 116 comprises an elongated, polygonal closed end and generally hollow element which is formed by a wall portion 120. The wall portion may comprise a screen material such as wire or plastic mesh material which is sufficiently rigid to retain the desired shape. Suitable mesh materials may be formed from aluminum, steel, stainless steel, nylon, or Teflon as well as other materials.

To allow communication between the interior spaces and the exterior surfaces of the devices a plurality of apertures 124 are formed in the wall portions. The apertures generally comprise the interstitial spacing between the material weave but other types of apertures may be provided. The mesh size of the screen material must be such to allow liquid and gas permeability while preventing passage of the catalyst particles into the internal spaces of the mass transfer devices. The devices 116 may also be constructed with the wall portion formed from materials suitable for providing a skeletal structure to support a screen or other porous material in the desired geometric configuration. Such a construction would allow the use of less rigid screen materials such as those fashioned from cotton, fiberglass, polyester, nylon and the like to enclose the apertures formed in the wall portion.

To facilitate joinder of the mass transfer devices 116 into an interlocking grid, notches 123 are cut through the mass transfer devices 116 at locations where adjacent devices are joined together. The notches extend through approximately one-half of the vertical or transverse cross-sectional distance of the devices and allow denser packing of the devices within the vertical cross-section of the catalyst bed. The devices in the bottom and top layers of the grid have notches formed only on the upper and lower surfaces, respectively, while the other devices have notches formed on both surfaces. In some cases only two layers of the devices 116 will be joined together in which case each layer will have notches in one side only. The devices may alternately be formed without notches and other methods used to join the devices into the desired packing grid arrangement.

The catalyst bed 117 preferably comprises any solid particulate material that has flow characteristics which allow it to be dumped into the distillation column 110 and form the catalyst bed surrounding the interconnected grid of mass transfer devices 116. The catalyst is preferably in the form of cylindrical extrudates or small beads but may also comprise irregularly shaped granules or fragments and is sized to meet the requirements of the particular applications. The catalyst may take any of the forms or the materials previously described in conjunction with the preferred embodiment.

Mass transfer devices 116 are loaded into the distillation column by known methods with the packing height determined by the process parameters. The catalyst bed is then formed by simply dumping the particulate solid catalyst into the column. The catalyst may also be easily removed by simply opening the dump valves located at the bottom of the reaction zone.

Once in place within the distillation column, catalytic structure 114 operates in a manner similar to structure 14 and has particular applicability with liquid phase reactions having products separable by distillation and counter current gas/liquid contacting in liquid phase heterogeneous catalyst systems. The surfaces of the mass transfer devices form interconnected mass transfer zones and the adjoining catalyst bed forms a reaction zone.

Figure 6:
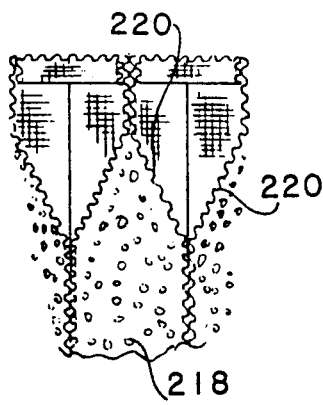
FIG. 6 is a vertical cross-sectional view taken along line 6—6 of FIG. 5.
Figure 7:
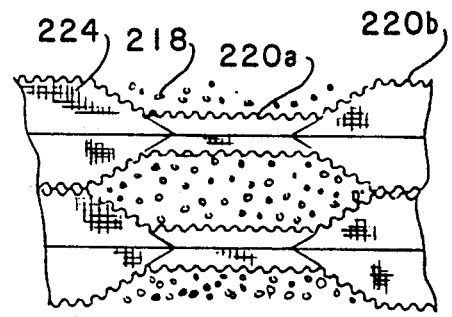
FIG. 7 is an angular cross-sectional view taken along lines 7—7 of FIG. 5.

Referring now to the alternative embodiment shown in FIGS. 5-7, a distillation column of generally square cross-sectional configuration is shown in FIG. 5 and designated generally by the numeral 210. Column 210 is provided with a catalytic structure 214 which is disposed within a portion of the column and which concurrently serves as a catalytic reaction and distillation structure. Although column 210 is shown in square cross-section, it is to be understood that other shapes and cross-sectional configurations may be employed. Catalytic structure 214 comprises mass transfer devices 216 between which is a fixed catalyst bed 217 comprising solid catalyst particles 218. Devices 216 are all identical in construction and are formed from two interconnected mirror image plates 220, preferably formed from a mesh material. The mesh presents a plurality of apertures 224 in the plates. As discussed with the previous embodiments, the size of openings 224 must be such to allow liquid and gas permeability while preventing passage of catalyst particles 218 into the internal spaces of the mass transfer devices. The two apertured plates 220 are joined together at the areas of mutual contact by spot welding so as to assure a rigid uniform construction. Other means of connecting two apertured plates to form a rigid structure could likewise be used.

As best illustrated in FIG. 7, the respective plates 220 are shaped into concave semi-cylindrical sections 220a which are interconnected with concave truncated pyramid shaped sections 220b. The concave sections on adjacent plates are arranged in mirror image fashion to present the hollow open areas of the devices 216. The flat areas which form the end walls of sections 220b are in contact with the corresponding wall portion of an adjacent device 216 and the devices 216 are also in contact with one another in a vertical direction so that the open areas of one row of the devices can communicate directly with the open areas of a vertically adjacent row of devices. Thus, a series of interconnected mass transfer zones are provided around which the catalyst bed 216 forms a reaction zone.

Devices 216 are loaded into a distillation column by known methods with the packing height determined by process parameters. Once a row of the devices is in place, the catalyst bed may be formed by simply dumping the particulate solid catalyst into the column to occupy the voids between each adjacent pair of the devices. It is preferable to arrange the devices 216 so that each vertical row is oriented 90° relative to the row beneath and above it. This technique is well-known and is illustrated in FIG. 5. Once in place, the catalytic structure 214 operates in a manner similar to structure 114 previously described.

During process operations, utilizing the devices of the present invention as aforedescribed, the liquid phase of the fluid streams preferentially flows through the permeable catalyst bed while the vapor phase travels through the continuous channels formed by the interior spaces of the interconnected mass transfer devices. As the liquid flow is increased, the permeable catalyst bed becomes saturated, the liquid reaches the surfaces of the mass transfer devices and some liquid may pass into the interior spaces of the devices. Contact between liquid and vapor phases within and on the surfaces of devices 16, 116 and 216 results in effective mass transfer. By controlling process parameters such as the liquid flow rate, the quantity of liquid reaching the mass transfer zone may be regulated. Controlling the liquid flow rate also regulates the amount of liquid entering the catalytic reaction zone.

It may also be desired to utilize mass transfer devices 16, 116 and 216 as distillation or mass transfer structures without the use of the surrounding catalyst bed. In such an application the devices would advantageously present mass transfer zones for the liquid and vapor phases in the distillation process.

Manifestly, the present invention encompasses a process for concurrent catalytic reaction with distillation of fluid streams within a distillation column having a catalyst therein. The process includes the steps of providing catalytic reaction and mass transfer zones within the column, feeding a liquid stream to the column, directing the liquid stream through the reaction zone, and distilling a portion of the liquid in the column to present a vapor stream. The vapor and liquid streams are then directed to the mass transfer zone for interaction and the fluid distillation and reaction products are then withdrawn from this section of the column. Preferably, the mass transfer zone is presented by surfaces of a plurality of hollow bodies, at least a majority of which, and preferably substantially all of which, are in contact with one another.

Another aspect of the invention is a method of preparing a distillation column for a reaction with distillation process utilizing a particulate catalyst wherein the method includes the steps of loading a plurality of hollow mass transfer devices into the column, each of which devices comprises a hollow rigid structure presenting an open interior space, and then loading particulate catalyst into the column to fill in the void areas between the devices, thus forming a packed catalyst bed. The method is preferably carried out so that a first vertical section of the reactor is substantially filled with the devices and then the catalyst is added to fill the voids between the devices. Catalyst loading is stopped below the height of the devices and then more devices are loaded followed by more catalyst until the desired bed height is achieved. This loading method assures vertical and horizontal device to device contact throughout the entire dimensions of the bed.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, we claim:

1. A mass transfer column comprising:

means for presenting an elongated upright open column structure;

a plurality of mass transfer devices each having a wall of mesh like material enclosing an open interior space, said wall being fluid permeable and catalyst impermeable, said device presenting a mass transfer zone, a plurality of said devices being present at any given horizontal cross-sectional area of said column, a plurality of loose catalyst particles disposed within said column and around and between said mass transfer devices to present a catalyst bed comprising a catalytic reaction zone through which a fluid stream may flow and be catalytically reacted, said devices being at least partially surrounded by loose catalyst particles to present both catalyst particles and said devices in the same horizontal plane, substantially all of said devices being in physical contact with at least one adjacent device to interconnect said interior spaces so that a plurality of continuous, catalyst-free fluid stream flow channels are formed by said interconnected interior spaces and extend through said catalyst bed, said flow channels permitting another fluid stream to flow through said catalyst bed and pass from one device to another device without contacting the loose catalyst particles, whereby said mass transfer devices and catalyst bed allow concurrent catalytic chemical reaction and distillation of reaction products within said structure.

2. The mass transfer column of claim 1, wherein said mass transfer devices are elongated along an axial length.

3. The mass transfer column of claim 2, wherein said mass transfer devices are located in horizontal planes with the devices in one plane being rotated a selected axial displacement from the devices in an adjacent plane.

4. The mass transfer column of claim 3, wherein said mesh like material comprises wire or plastic mesh having a mesh size to prevent the passage of said catalyst particles therethrough.

5. A process for concurrent catalytic reaction with distillation of fluid streams within a mass transfer column, said process comprising the steps of:
   (a) feeding a fluid stream to said column;
   (b) concurrently (i) contacting a liquid phase of the fluid stream with a solid catalyst bed comprising a plurality of loose catalyst particles at least partially surrounding a plurality of mass transfer devices having walls of fluid permeable and catalyst impermeable screen-like material which present open interior spaces, substantially all of said devices being in physical contact with at least one adjacent device to interconnect said interior spaces so that a plurality of generally continuous, substantially catalyst-free, fluid stream flow channels are formed by said interconnected interior spaces and extend through said catalyst bed, both catalyst particles and said devices being present in the same horizontal plane, and (ii) distilling at least a portion of the liquid phase to form a vapor phase;
   (c) directing said vapor phase through the flow channels; and
   (d) directing the liquid phase through the loose catalyst particles to said devices for mass transfer between the liquid phase and the vapor phase flowing through the flow channels.

6. A method of preparing a column for a reaction with distillation process utilizing a catalyst comprising a plurality of particles and a plurality of mass transfer devices, each of which comprises a hollow substantially rigid structure of screen-like material which is fluid permeable and catalyst impermeable enclosing an open interior space, said method comprising the steps of:
   loading said mass transfer devices into said column so that substantially all of said devices are in physical contact with an adjacent device and the interior spaces are interconnected so that a plurality of generally continuous, substantially catalyst-free, fluid stream flow channels are formed by said interconnected interior spaces and extend through said catalyst bed, and a plurality of said devices are disposed in the same horizontal plane; and
   loading said catalyst into said column to form a catalyst bed of loose particles at least partially surrounding said devices so that both catalyst particles and said devices are present in the same horizontal plane,
   whereby said prepared column presents a reaction zone presented by said catalyst bed and a plurality of mass transfer zones presented by said mass transfer devices with said fluid stream flow channels being catalyst free and extending substantially vertically through said bed so that a fluid stream can flow along the flow channels and pass from one mass transfer device to another without passing though said loose catalyst particles.

7. Apparatus for providing mass transfer and catalytic reaction zones for fluid streams in a mass transfer column, said column containing a catalyst bed comprises of a plurality of solid catalyst particles having pore spaces between the particles, said apparatus comprising:
   a plurality of gas permeable mass transfer devices each having an apertured wall of screen-like material defining an open interior space, said wall being fluid permeable and catalyst impermeable,
   there being a plurality of said devices in the same horizontal plane,
   substantially all of said devices being in physical contact with at least one adjacent device to interconnect said interior spaces so that a plurality of generally continuous, substantially catalyst-free, fluid stream flow channels are formed by said interconnected interior spaces and extend through said catalyst bed, whereby a first fluid stream can flow through said catalyst bed in said flow channels and can pass from one device to another device without flowing through said pore spaces between the solid catalyst particles,
   said devices being disposed in said column in a manner such that each device is at least partially surrounded by loose catalyst particles so that both flow channels and catalyst are present in the same horizontal plane, whereby a second fluid stream can pass through said catalyst bed by traveling through said pore spaces between the catalyst particles.

8. The apparatus of claim 7, wherein said wall of each of said mass transfer devices is rigid with aperture extending through said wall.

9. The apparatus of claim 7, wherein said mass transfer devices are elongated along an axial length.

10. The apparatus of claim 9, wherein each mass transfer devices are located in horizontal planes with the devices in one plane being rotated a selected axial displacement from the devices in an adjacent plane.

11. The apparatus of claim 9, wherein said screen-like material comprises wire or plastic mesh having a mesh size to prevent the passage of said catalyst particles into the interior spaces of the mass transfer devices.

12. A process for concurrent catalytic reaction with distillation of fluid streams within a mass transfer column, said process comprising the steps of:
   (a) feeding a fluid stream to said column;
   (b) catalytically reacting a liquid phase of the fluid stream by contacting the liquid phase with a solid catalyst bed comprising a plurality of loose catalyst particles at least partially surrounding a plurality of mass transfer devices having walls of fluid permeable and catalyst impermeable material which present open interior spaces, substantially all of said devices being in physical contact with at least one adjacent device to interconnect said interior spaces so that a plurality of generally continuous, substantially catalyst-free, fluid stream flow channels are formed by said interconnected interior spaces and extend through said catalyst bed, both catalyst particles and said devices being present in the same horizontal plane;

(c) controlling the flow rate of the fluid stream to bring a portion of the liquid phase into contact with the open interior spaces of the mass transfer devices; and (d) directing a vapor phase through the catalyst bed along said fluid stream flow channels within the interconnect interior spaces of the mass transfer devices to bring the vapor phase into contact with said portion of the liquid phase for mass transfer between the vapor phase and liquid phase, said mass transfer occurring concurrently with said catalytic reacting of the liquid phase.

* * * * *